United States Patent Office 3,692,479
Patented Sept. 19, 1972

3,692,479
PREPARATION OF BINARY BORIDES, CARBIDES AND SILICIDES
Geoffrey W. Meadows, 312 S. Marshall St., Kennett Square, Pa. 19348, and Paul C. Yates, 2120 Shipley Road, Wilmington, Del. 19803
No Drawing. Continuation-in-part of application Ser. No. 250,442, Jan. 9, 1963, which is a continuation-in-part of application Ser. No. 824,943, July 6, 1959. This application Sept. 10, 1968, Ser. No. 758,830
Int. Cl. C01b 31/34, 33/06, 35/00
U.S. Cl. 423—291
2 Claims

ABSTRACT OF THE DISCLOSURE

Binary carbides, borides and silicides, such as tungsten carbide, having an average particle size of less than a micron, are prepared by reacting a pair of suitable reactants such as tungstic oxide and calcium carbide, in a molten metal halide bath such as sodium chloride, at a temperature of between 200 and 1200° C. in the presence of an alkali metal or alkaline earth metal reducing agent. The binary compounds thus produced are particularly useful in preparing hard, dense refractory materials.

CROSS REFERENCE TO RELATED APPLICATIONS

This application is a continuation-in-part of our copending application Ser. No. 250,442, filed Jan. 9, 1963, now abandoned, which in turn was a continuation-in-part of our then copending application Ser. No. 824,943, filed July 6, 1959, now abandoned.

BACKGROUND OF THE INVENTION

Binary borides, carbides and silicides having a refractory nature are often used in the preparation of dense refractory materials such as cutting, drilling and grinding tools, thread guides, dies, bearings and other objects requiring extreme hardness.

Generally these borides, carbides and silicides are made by processes which result in a molten product which when cooled forms a large solid mass which must be crushed, pulverized and graded to be in the form most desired, i.e. a fine uniform powder.

Many processes have been proposed by which borides, carbides or silicides could be prepared in an initially fine powder form. Such processes while sometimes successful are uniformly plagued by drawbacks such as high cost, lack of purity or low yield.

Other refractory materials such as metal nitrides have been made in fine powder form by processes such as that disclosed in Litz U.S. Pat. No. 2,974,013. However, the reaction conditions and reactants necessary for the production of refractory nitrides such as boron nitride cannot be used for the preparation of carbides, borides and silicides.

We have discovered a process by which the carbides of boron and silicon, silicon borides, and the borides, carbides and silicides of titanium, zirconium, hafnium, vanadium, niobium, tantalum, chromium, molybdenum and tungsten can be prepared in the form of a fine uniform powder of good purity in good yield. The borides, carbides and silicides are formed by chemical reaction in a fused salt bath. By this process it is possible to control the reaction temperature, and by using proper proportions of the reactants, the desired product is obtained in the form of discrete macro-molecular particles or crystallites somewhat similar in structure to organic polymer molecules.

SUMMARY OF THE INVENTION

In summary, this invention is directed to a process for preparing a particulate binary carbide of boron or silicon, silicon boride, or a boride, carbide or silicide of titanium, zirconium, hafnium, vanadium, niobium, tantalum, chromium, molybdenum, or tungsten wherein the particles have an average ultimate size of from 10 to 250 millimicrons and are further characterized by having an X-ray diffraction line broadening coefficient K', of from $9 \times 10^{-2}$ to $3.6 \times 10^{-4}$ as calculated from the expression:

$$K' = \beta \frac{\cos \theta}{\lambda}$$

where $\beta$ is the pure angular breadth in radians of a powder reflection free of all broadening due to the experimental method employed in observing it,
$2\theta$ is the angle of deviation of the diffracted beam, and
$\lambda$ is the wavelength in angstrom units of monochromatized CuK$\alpha$ radiation X-rays, comprising the steps of (a) Dispersing in a molten metal halide bath at 200 to 1200° C. a reducing agent selected from among the alkali and alkaline earth metals, together with at least a pair of reactants of which one contains one element of the binary compound to be prepared and another contains the other element of the binary compound, the proportions of the reactants being such that the atomic ratio of said elements in the separate reactants is the same as that in the desired binary compound, at least one of said reactants being a compound wherein the essential element has a positive valence, and the proportion of reducing agent being about that stoichiometrically required to reduce said positive-valanced element to its zero-valence, elemental form, whereby chemical reaction occurs to form the particulate binary compound, (b) Continuing the heating until the binary compound particles become flocculated, and (c) Separating the flocculated binary compound from the salt bath.

By this process the binary compounds are prepared in good yield having a uniform fine particle size and good purity.

DESCRIPTION OF THE INVENTION

This invention is directed to a process for preparing particulate binary borides, carbides and silicides. For conveinence these binary compounds will be referred to hereinafter as "bocasi" compounds.

The process

The bocasi powders of this invention are produced by processes in which the bocasi is formed by chemical reaction in a fused salt bath. By using fused salt as the reaction medium it is possible to control the temperature of the reaction, and by using such proportions of the reactants as to yield the desired stoichiometric quantities of the essential elements in elemental form upon reduction, and by using stoichiometric proportions of the reducing metal, the concentrations of the reacting essential elements are controlled at a desired high level so as to give an abundance of new nuclei for crystallite formation. The result is that the bocasi is retained in the form of discrete macro-molecular particles or crystallites which, except for their inorganic constituents, are similar in structure to organic polymer molecules. As will be hereinafter further described, the discrete boscai particles exhibit a degree of three dimensional bonding of atoms within specific limits which is analogous to the combining of monomers to form molecules of organic polymers. This degree of three-dimensional atomic bonding is hereinafter expressed as the crystallite atomic extensity coefficient and, as will be further described, the particulate bocasi products of this invention have an average crystallite atomic extensity coefficient ranging from 4.60 to 8.80.

(a) Control of crystallite atomic extensity.—The extent of atomic bonding in the microcrystalline products is determined by the reaction time and temperature and by the solubility of the reactants and products in the melt system. For a particular product the extent of atomic bonding in the ultimate particles will increase with time and temperature, but this effect will be minimized in those products which have low solubility in the melt. Broadly speaking, solubility is related to melting point, and at the same melt temperature the extent of atomic bonding in the ultimate particle is an inverse function of the melting point of the product. For example, molybdenum disilicide (M.P. 2030° C.) prepared at 880 to 900° C. has an average crystallite atomic extensity coefficient from 7.6 to 7.7, whereas silicon carbide (M.P. 2600° C.) made at the same temperature has an average crystallite atomic extensity coefficient from 4.6 to 4.7. Moreover, increasing the temperature of the melt by 100° C. greatly increases the average crystallite atomic extensity coefficient in the case of molybdenum disilicide, but has little effect upon the atomic extensity coefficient of the silicon carbide crystallites. The effect of reaction time is similar, in that products having higher solubility in the melt will exhibit increased crystallite atomic extensity coefficients with prolonged exposure to high temperature in the molten system. Consequently, the time and temperature conditions required to give a desired average crystallite atomic extensity coefficient are dependent on the nature of the product, as will be apparent from the examples given hereinafter.

The degree of crystallite atomic extensity in the melt is minimized by maintaining a high degree of supersaturation of the reacting species. This leads to the continuous creation of fresh nuclei during the process, and limits the degree of atomic extensity in the microcrystallites formed in the earlier stage of the reaction. In preferred processes of the invention the concentration of the reactants in terms of their essential elements should be at least 100-fold the concentrations required by the solubility product of the bocasi being produced.

In particular it is desirable to control the rate of addition of the reactants so as to maintain in the melt a degree of supersaturation of the reacting bocasi essential elements as just mentioned. This can conveniently be accomplished by mixing the reactants at a sufficiently high initial concentration and maintaining this concentration level throughout the process. The degree of supersaturation in the melt at any given moment can be readily ascertained by drawing off a sample and determining the concentration of the essential elements therein according to ordinary techniques of analytical chemistry.

The maintenance of a supersaturated condition in the melt becomes more important at higher temperatures, and with the lower melting products. The supersaturated condition minimizes crystallite atomic extensity and avoids formation of particles having a wide range of atomic extensity in the final product. In some applications of the products of the invention, however, a controlled crystallite atomic extensity distribtuion may be advantageous and the process of the invention is readily adaptable to the preparation of such compositions by careful control of the above-mentioned reaction variables.

(b) Types of molten salts used.—The fused salt can be a single salt or a mixture of salts. Broadly, the salt or salts can be any which do not decompose at the temperature of the reaction. Molten halides are preferred, since it is desired to maintain a reducing environment throughout the reaction system. Particularly preferred are the chlorides of the alkali or alkaline earth metals and eutectic-forming mixtures of these salts. For temperatures above 600° C. lithium chloride, sodium chloride and calcium chloride are most useful, and between 300 and 600° C., mixtures of aluminum chloride with either lithium or sodium chloride can be used.

The salt employed must, of course, be more difficult to reduce than the corresponding precursor of the bocasi undergoing reduction. For example, $WO_3$ could be reduced by sodium in a $NaCl$-$AlCl_3$ melt in the presence of carbon to form WC, but $NaCl$-$AlCl_3$ could not be used as a reaction medium to reduce $TiO_2$ with calcium in the presence of carbon to form TiC because of the greater ease of reduction of the solvent system itself and the probability of a competing reaction.

(c) Reactants.—Each of the reactants will contain one of the elements of the bocasi, but obviously not the same one.

Chemically, a reactant can be any material which forms one of the components of the bocasi in the elemental state under the reducing conditions existing in the molten salt bath. Either of the reactants can be the element itself, and either or both can be a compound containing the element, said compound being reducible during the reaction to give the element. In other words, at least one of the reactants is a compound of an essential element of the bocasi to be produced. In such a compound reaction the essential element will have a positive valence. For example, when titanium dichloride is used as a reactant and source of titanium in making titanium silicide, the titanium has a positive valence of two.

In a preferred aspect of the invention at least one of the reactants will be soluble in the fused salt bath. The speed of the reaction is increased as the particle size of the reactants is diminished, and the most rapid rate of reaction is achieved when both reactants are molecularly dispersed, i.e., are in solution.

The type and variety of reactants that can be used will be apparent from the numerous examples given hereinafter.

(d) Reducing agents.—The reducing conditions are provided by having present the amount of an alkali or alkaline earth metal stoichiometrically required to reduce the positive-valenced element to its zero-valence, i.e., its elemental state. Chemical reaction occurs to form the particulate bocasi and the heating is continued until the bocasi particles become fluocculated. These fluocculated particles are separated from the melt, such as by filtering them off.

The reducing agent is selected from metals of the group consisting of alkali and alkaline earth metals. Thus, the metal can be, for example, sodium, potassium, lithium, calcium, magnesium, barium, or strontium; sodium, calcium or magnesium being preferred.

(e) Temperatures.—The temperature of the reaction is in the range of from 200 to 1200° C. More particularly it is preferred to operate in the range of from 400 to 1100° C., the range from 600 to 1000° C. being especially preferred.

(f) Initiation of reaction.—To initiate the reaction the reactants are dispersed with agitation in the molten salt bath. The dispersion can be molecular, as when the reactant actually dissolves in the bath, or it can be colloidal, as when colloidal carbon is used to form carbides. The dispersion can be of particles even larger than the colloidal range, especially when the other reactant is soluble in the bath. The nature and degree of the agitation of the bath should be sufficient to disperse the reactants substantially uniformly throughout the bath as fast as they are added. Such dispersion is facilitated, of course, by adding the reactants continuously or in small increments, and in stoichiometric proportions.

It is essential when adding the reactants and reducing agents, whether continuously or in small batches, to maintain correct stoichiometric proportions as close as feasible to those of the elements in the desired product. The manner in which this is accomplished is described in more detail in the illustrative examples. The correct stoichiometric proportions of reactants, of course, are those which provide the essential elements in the same atomic ratio as they have in the desired bocasi. The correct stoichiometric proportion of metal reducing agent is that required to convert the positive-valenced essential elements in the reactant compound or compounds to the zero-valenced, elemental form. It will be understood, of course, that some of the desired bocasi can be formed even without such control of stoichiometry, but the product will be contaminated with impurities.

While it is desirable to build up the concentration of the bocasi product as much as possible in the fused salt bath, in practice it will seldom exceed 30%.

To avoid excessive oxidation, the reaction should be conducted under an inert atmosphere, such as helium or argon, from which oxygen has been removed by passing the gas over titanium sponge heated to 700 to 800° C.

(g) Materials of construction of reactor.—The material used for constructing the equipment which is to come into contact with the melt is important from the standpoint of the product purity. Corrosion problems become more severe as the temperature is increased, and even if the mechanical strength of the material of construction is not impaired, the corrosion products will contaminate the melt and consequently the product. The most satisfactory materials of construction from the standpoint of corrosion resistance are the non-metallics such as graphite, impervious alumina and zirconia, and silicon nitride-bonded silicon carbide. These materials are used despite the fact that they are relatively difficult to fabricate, are lacking in mechanical strength, and in most instances are sensitive to thermal shock. These deficiencies are minimized by careful equipment design.

At the highest temperature used, corrosion and strength properties of most metals and alloys are such as to render them unsatisfactory, and above 1000° C., non-metallic materials are preferred. High-melting metals or alloys coated with ceramic or other non-metallic materials by flame spraying or sintering are particularly useful in the practice of the invention in the higher temperature range. Below 1000° C., high temperature alloys such as "Hastelloy" B and C, "Haynes" 25 and "Inconel" are satisfactory in the most instances.

(h) Recovery of products.—In the reaction the bocasi is formed initially in the form of discrete macromolecular crystallites. As the reaction progresses and the heating is continued these ultimate particles or crystallites become substantially flocculated in the fused salt bath. The heating is continued until this flocculation has proceeded to a substantial degree. It will be understood, however, that such flocculating of the particles is not equivalent to increasing the crystallite atomic extensity, since in the flocculated product the ultimate particles or crystallites are still discernible.

With the exception of boron carbide, the density difference between the bocasis and the molten salt phase is sufficient to cause the flocculated bocasi particles to concentrate at the bottom of the melt when stirring is discontinued. This permits a bocasi-rich fraction to be recovered by draining off the upper layer of salt. The recovered salt can be reused if desired.

Alternatively, most of the salt phase can be removed by filtration, using ceramic or fritted metal filters. This process can be facilitated in the case of high-melting salts by the addition of a miscible lower melting salt, or, preferably, an eutectic-forming salt, which enables the filtration to be conducted at a considerably lower temperature. Thus, aluminum chloride-sodium chloride or aluminum chloride-lithium chloride mixtures are fluid at 150° C. and can be filtered using conventional fritted glass filters. However, in view of the tendency of aluminum chloride to sublime, it is necessary to use pressure filters for this operation.

When it is desired to isolate a salt-free product under anhydrous conditions and without exposure to the atmosphere, this can be accomplished by washing residual salts of low volatility from the sedimented layer or the filter cake using a volatile molten salt such as titanium tetrachloride, phosphorus trichloride, stannic chloride, bismuth trichloride, aluminum chloride, or molybdenum pentachloride, and finally distilling off the volatile solvent from the bocasi product.

Alternatively, the bocasi in the sedimented or filtered residue can be freed from salt by extracting the salt out of the solidified product using anhydrous solvents such as methanol or ethylene glycol. This is accomplished by repeated cycles of slurrying with the extracted solvent and recovering the desired product by filtration or centrifugation.

It will be understood that while the bocasi is separated from the fused salt bath at this point in a flocculated, i.e. a loosely aggregated, condition, it is not so highly aggregated that it resists redispersion. On the contrary, the product is so loosely agglomerated that it is readily peptized to form suspensions or sols in liquid media.

(i) Exposure of products to oxygen.—In processes of this invention, after the bocasi has been formed it can at some point be exposed to an oxygen-containing environment. Such exposure can be made as part of the step of recovering the product from the molten salt bath, as by employing an aqueous extraction method. Water is considered an oxygen-containing environment because the bocasi, by reason of its high surface area and very reactive surface, can react with the water and combine with the oxygen therein, to form either the oxide or hydrated oxide of the bocasi.

This reaction with water is a surface reaction and its rate decreases rapidly as the surface of the bocasi becomes covered with oxides or hydrated oxides of the elements in the bocasi, provided that the pH is such that the oxidation products are insoluble. Also, in order to prevent excessive attack on the bocasis the aqueous extraction is carried out at low temperatures—say, in the range of 0 to 10° C. The pH is controlled between the limits of about 4 and 10 during the extraction, the particular choice of pH being dependent on the stability of the oxide formed. In the cases of silicon carbide or molybdenum disilicide, for instance, a pH of 7 to 8 is preferred, whereas for zirconium carbide, a pH of 4 to 5 is preferred. The object of the pH control is to maintain a stable oxide layer on the surface of the bocasi particles and thus prevent further attack.

If the bocasi has been recovered from the salt without exposure to an oxygen-containing environment, either by reason of extraction with anhydrous solvents or by filtration and washing with volatile salts, it can subsequently be subjected to the oxygen-containing environment to provide an oxide coating on the bocasi particles. This can be accomplished merely by bringing the particles into contact with an oxygen-containing atmosphere or an atmosphere containing moisture, the amount of oxygen or oxygen-containing component in such atmosphere being no more than that which it is desired to incorporate into the bocasi. Also, means are provided for controlling the temperature during such exposure, since the reaction with the bocasi is exothermic and should not be permitted to get out of hand. After the bocasi particles have reacted with oxygen to the desired extent the product is relatively immune to further reaction and can even be exposed to air without deleterious results.

The percentage of oxygen by weight which is combined with the bocasi in the foregoing oxidation step is in the range of from $$\frac{18D^2+12D+2}{5D(\rho D^2+1.8D+1.2)}$$

to 25%, where D is the average particle diameter in millimicrons and $\rho$ is the density of the bocasi in grams per milliliter. In preferred aspects of the invention it is preferred that the oxygen content be within the range of $30/\rho D$ to 10%.

(j) Purification of products.—As previously discussed, the bocasi products are recovered from the salt reaction medium by various processes, including sublimation of the salt, filtration, or dissolution of the salt in a suitable aqueous or non-aqueous solvent, followed by centrifugation. Owing to the high surface area and loosely flocculated state of the products at this point, they will still contain a considerable quantity of residual salt, reaction by-products, and corrosion products arising from attack on the equipment used during synthesis. In some instances, it will be found that the formation of a corrosion layer, usually of an oxide, on the surface of the bocasi particles will be sufficiently extensive that it is desirable to remove this layer by further purification. For any or all of the above purposes, further purification steps can be included to prepare products of optimum purity.

The first step in such purification is usually to expose the bocasi particles to a relatively concentrated, aqueous solution of a non-oxidizing acid, preferably a monobasic acid such as hydrochloric acid. The bocasi products of this invention are usually sufficiently insoluble that it is possible to treat them with concentrated acid at elevated temperature, for example, 100° C. This acid treatment dissolves by-products such as calcium oxide and it also leaches the metal ions out of complex impurity by-products such as calcium silicate, which would otherwise make subsequent purification steps less effective.

Following the treatment with acid, the product is recovered by filtration or by centrifugation, washed to remove excess acid, and treated with other possible purification reagents. Since the particular choice of these will depend upon the particular bocasi composition concerned, it is not possible to generalize except to the extent that the reagent will be one capable of preferentially dissolving the impurities without any substantial attack on the bocasi itself. For example, in the case of most silicides or silicon carbide, the corrosion layer on the surface developed during the previous recovery by aqueous dissolution of the salt, often comprises silica or metal silicates. These can be removed substantially completely by the addition of hydrofluoric acid, concentrated solutions of sodium hydroxide or other reagents which are known to attack silica. Here again, the reaction can be conducted at an elevated temperature. The product can then be washed and recovered as previously discussed.

Contamination in the form of transition metal ions such as iron can be encountered if equipment such as stainless steel is used in the fused salt reaction. These can be removed by treatment with complexing agents such as ethylenediamine tetraacetic acid hydroxyacetic acid, citric acid, and others known in the art for their ability to form soluble, stable complex ions with the transition metals.

Finally, further purification can be accomplished by treating the bocasi products at high temperature with gases. For example, the oxygen content of the product can be lowered substantially by suitable reduction at elevated temperatures. Tungsten carbide can be reduced of all of its oxygen content by treatment with hydrogen at a temperature of about 900° C. Silicon carbide or molybdenum disilicide can be freed from oxygen by mixing it with an amount of carbon black stoichiometrically equivalent to the oxygen content of the product, and heating at 1400 to 1600° C. under a vacuum or in a stream of inert gas such as argon. By these procedures, it is possible to obtain bocasis of substantially 100% purity.

(k) Preparation of mixed products.—It is understood that although the foregoing description has related to the preparation of a particular bocasi, the same techniques can be used to prepare complex mixtures of the bocasi powders of this invention. When more than one bocasi is prepared simultaneously by suitable reduction reactions in the salt melt, the final product comprises a very intimate mixture of the two or more bocasi particles. This occurs in those instances where the bocasis are essentially insoluble in one another. If, however, two bocasis are simultaneously prepared which show a substantial degree of mutual solubility in one another, for example, titanium carbide and tungsten carbide, a mixed crystal type of bocasi, in which both constituents are present in a common lattice, is formed.

A mixture of boron carbide and silicon carbide can be prepared by feeding silica, boric oxide, magnesium and carbon in stoichiometric proportions into a rapidly stirred melt held at 900° C. of calcium chloride. When stoichiometric proportions are maintained for all of the above reactants, the product recovered will be an intimate macro-molecular mixture of boron carbide and silicon carbide.

A considerable number of mixtures of a bocasi with various refractory non-bocasi compounds can also be prepared. One can, for example, prepare a mixture of molybdenum disilicide and titanium nitride by a reaction in which a mixture of calcium molybdate, titanium dioxide, calcium nitride, calcium, and silica are introduced simultaneously into a calcium chloride melt.

One can similarly prepare complex mixtures of various refractory oxides with the bocasi products of this invention by a suitable choice of the oxide concerned and close control over stoichiometry. Thus, for example, since thoria is much more difficult to reduce than is silica, it is possible to prepare a macro-molecular mixture of silicon carbide and thoria by feeding a reaction mixture of colloidal thoria, silica, and carbon, along with a suitable reducing agent such as sodium, calcium, or magnesium metal simultaneously into the molten salt. If only enough reducing agent and carbon are introduced to allow for the stoichiometric formation of silicon carbide from the silica present, the thoria will remain in an unreduced state and will be recovered as an intimate macro-molecular mixture with the macro-molecular silicon carbide.

A wide variety of other complex or composite powders can be prepared by this method, as will be readily apparent to those skilled in the art, and as will be illustrated further in the examples.

The products (a) Particulate character.—The bocasi products are particulate in character. They are made up of ultimate particles or crystallites which are macro-molecular. These ultimate particles can be aggregated but the aggregates are loosely bound together and are easily redispersible. Thus, the bocasi products can be in the form of fine powders in which the ultimate particles are held together merely by surface forces, and they can be in the form of sols by dispersing them in water or organic liquids, such as lower alcohols, for instance methanol, ethanol, propanol, butanol, or glycols or glycol derivatives such as ethylene glycol, or diethylene glycol monoethylether or glycol monoethylether.

(b) Particle dimensions.—The bocasi particles have an average dimension in the range of 10 to 250 millimicrons, preferably from 10 to 100 millimicrons. It will be understood that the dimension given is an average one, but ordinarily all three dimensions of the particles here involved are about the same, so that for practical purposes the dimension can be considered the diameter of a spherical particle.

The particle dimension can be determined by any method with which the art is already familiar. It can be measured directly by observation of electron micrographs. It can also be calculated from nitrogen adsorption data as described in "A New Method for Measuring the Surface Area of Finely Divided Materials and for Determining the Size of the Particles," by P. H. Emmett in "Symposium on New Methods for Particle Size Determination and the Subsieve Range" in the Washington Spring Meeting of A.S.T.M., Mar. 4, 1941.

The surface area of the particles or crystallites in square meters per gram, A, is related to the average diameter, D, in millimicrons (m$\mu$) according to the expression $$D = \frac{6000}{\rho A} \text{ m}\mu$$

where $\rho$ is the density of the bocasi, if the particles are approximately spherical in shape, or by the expression $$D = \frac{4000}{\rho A}$$

if they are in the form of fibers or long rods.

(c) Microcrystalline character.—The bocasi products of the invention are microcrystalline and are readily characterized by X-ray diffraction analysis of the powders. A particular bocasi is identified by comparison of its measured "$d$" value with the published "$d$" value for that bocasi in macrocrystalline form. Although the diffraction pattern enables this identification to be made, the diffraction lines of the novel compositions differ substantially from those obtained for the corresponding macrocrystalline materials with respect to both their breadth and their relative intensities, as explained in greater detail below.

The pure breadth of a diffraction line is readily determined by procedures described in detail in such standard texts as "X-Ray Diffraction Procedures" by Klug and Alexander, published by John Wiley and Sons, Inc. (1956). Using this quantity the compositions of the invention are described by the following equation:

$$K' = \frac{\beta \cos \theta}{\lambda}$$

$\beta$ is the pure angular breadth in radians of a powder reflection free of all broadening due to the experimental method employed in observing it.
$\lambda$ is the wavelength of the X-rays in angstroms.
$2\theta$ is the angle of deviation of the diffracted beam.

K', designated the line broadening coefficient, is a function characteristic of the compositions of the invention and the nature of the radiation used. Thus, for monochromatized CuK$\alpha$ radiation, the range of permissible values for K' is $9 \times 10^{-2}$ to $3.6 \times 10^{-4}$. Similarly for monochromatized MoK$\alpha$ radiation, the range of permissible values for K' is $1.84 \times 10^{-1}$ to $7.35 \times 10^{-4}$.

It will be observed that the bocasi products with which this invention is concerned are the carbides, borides and silicides of the Groups IV, V and VI transition metals and additionally the carbides of silicon and boron and the silicon borides. It is well known that these materials exist in a variety of crystalline forms and often in several stoichiometric compositions. For example, silicon carbide is obtained as the alpha form, having a hexagonal form or rhombohedral cell structure, and also as the beta form, a face-centered cubic lattice arrangement. The alpha form itself is known to exist in at least twelve crystalline forms, differing only in the arrangement and number of layers in the unit cell.

The following tabulation shows known binary compounds which can be produced in a modified form according to the present invention.

TABLE 1

Carbide compositions

| Compounds: | Known composition |
| --- | --- |
| Boron carbide | $B_4C$; $B_6C$. |
| Silicon carbide | SiC*. |
| Titanium carbide | TiC. |
| Zirconium carbide | ZrC. |
| Hafnium carbide | HfC. |
| Vanadium carbide | VC; $V_2C$; $V_4C_3$; $VC_2$. |
| Niobium carbide | NbC; $Nb_2C$. |
| Tantalum carbide | TaC; $Ta_2C$*. |
| Chromium carbide | $Cr_{23}C_6$; $Cr_7C_3$; $Cr_3C_2$; CrC; $Cr_5C_2$; $Cr_4C$. |
| Molybdenum carbide | $Mo_2C$; MoC*. |
| Tungsten carbide | $W_2C$*; WC. |

*For these compounds two or more crystalline forms have been reported.

TABLE 2

Boride compositions

| Compounds: | Known composition |
| --- | --- |
| Silicon boride | $SiB_3$; $SiB_6$. |
| Titanium boride | $Ti_2B$; TiB; $TiB_2$; $Ti_2B_5$. |
| Zirconium boride | ZrB; $Zr_3B_4$; $ZrB_2$; $ZrB_4$; $ZrB_{12}$. |
| Hafnium boride | HfB; $HfB_2$. |
| Vanadium boride | $V_2B$; VB; $V_3B_4$; $VB_2$; $V_2B_5$; $VB_3$. |
| Niobium boride | $Nb_3B$; $Nb_2B$; NbB; $Nb_3B_4$; $NbB_2$. |
| Tantalum boride | $Ta_3B$; $Ta_2B$; TaB; $Ta_3B_4$; $TaB_2$. |
| Chromium boride | $Cr_4B$; $Cr_2B$; $Cr_5B_3$; $Cr_3B_2$; CrB; $Cr_3B_4$; $CrB_2$; $Cr_2B_5$. |
| Molybdenum boride | $Mo_2B$; $Mo_3B_2$; MoB*; $Mo_3B_4$; $MoB_2$; $Mo_2B_5$*. |
| Tungsten boride | $W_2B$; WB*; $WB_2$; $W_2B_5$. |

*For these compounds two or more crystalline forms have been reported.

TABLE 3

Silicide compositions

| Compounds: | Known composition |
| --- | --- |
| Titanium silicide | $Ti_2Si$; $Ti_5Si_3$; TiSi; $Ti_2Si_3$; $TiSi_2$. |
| Zirconium silicide | $Zr_4Si$; $Zr_2Si$; $Zr_5Si_3$; $Zr_3Si_2$; $Zr_4Si_3$; $Zr_6Si_5$; ZrSi; $ZrSi_2$. |
| Hafnium silicide | HfSi; $HfSi_2$. |
| Vanadium silicide | $V_3Si$; $V_2Si$; $V_5Si_3$; $V_3Si_2$; $VSi_2$. |
| Niobium silicide | $Nb_4Si$; $Nb_2Si$*; $Nb_5Si_3$; $Nb_3Si_2$; $NbSi_2$. |
| Tantalum silicide | $Ta_5Si$; $Ta_2Si$; $Ta_5Si_2$; $Ta_5Si_3$; $Ta_3Si_2$; $TaSi_2$. |
| Chromium silicide | $Cr_3Si$; $Cr_2Si$; $Cr_5Si_3$; $Cr_3Si_2$; CrSi; $Cr_2Si_3$; $CrSi_2$; $Cr_2Si_7$. |
| Molybdenum silicide | $Mo_3Si$; $Mo_5Si_3$; $Mo_3Si_2$; $Mo_2Si_3$; $MoSi_2$. |
| Tungsten silicide | $W_3Si$; $W_5Si_3$; $W_3Si_2$; $W_2Si_3$; $WSi_2$. |

*For this compound two crystalline forms have been reported.

(d) Degree of crystallite atomic extensity.—The particulate bocasi products of the present invention, as stated hereinabove, are macro-molecular, being similar in structure to organic polymer molecules. Corresponding to the degree of polymerization obtained in the formation of organic polymers, the bocasi crystallites of the present invention manifest a degree of atomic extensity. In other words, the expression, "degree of crystallite atomic extensity," refers to the total number of atoms which are three-dimensionally bonded to form a discrete bocasi crystallite in a manner analogous to the combining of monomers to form organic polymer molecules.

The degree of crystallite atomic extensity in the particulate bocasi products of the present invention is expressed as a coefficient, E, which is determined from the formula:

$$E = 24.42 + \log \frac{\rho n r^3}{M}$$

where $\rho$ is the specific gravity of the bocasi in grams per cubic centimeter;
$n$ is the number of atoms per unit formula of bocasi;
$r$ is the average radius of the coherent bocasi crystallite in centimeters as determined by an electron micrograph; and
$M$ is the formula weight of the bocasi.

The crystallite atomic extensity coefficient can also be determined from the formula:

$$E = 13.85 + \log \frac{n}{M \rho^2 A^3}$$

where $\rho$ is the specific gravity of the bocasi in grams per cubic centimeter;
$n$ is the number of atoms per unit formula of bocasi;
$A$ is nitrogen surface area of the bocasi crystallite in square meters per gram; and
$M$ is the formula weight of the bocasi.

A third suitable determination can be made from the formula:

$$E = \log \frac{\rho n}{(K')^3 M} - 0.62$$

where $\rho$ is the specific gravity of the bocasi in grams per cubic centimeter;
$n$ is the number of atoms per unit formula of bocasi;
$K'$ is the line broadening coefficient of the coherent bocasi crystallite as determined by X-ray diffraction; and
$M$ is the formula weight of the bocasi.

While all three of the above methods are generally suitable for determining the crystallite atomic extensity coefficient for the bocasi products of this invention, the third determination which employs the X-ray diffraction line broadening coefficient will in some instances, be inapplicable. If the line broadening coefficient has been overly influenced by lattice distortions in the bocasi crystallite, this determination for atomic extensity cannot be relied upon to characterize the bocasi. Accordingly, the first two of the above three formulas provide the preferred means for characterizing the bocasi products of this invention.

The particulate bocasi products of this invention have average crystallite atomic extensity coefficients ranging from 4.60 to 8.80. This will be even more readily understood by reference to the numerous examples given hereinafter.

(e) Oxygen content.—Some of the novel products of the present invention are characterized by containing a minor, but definite, percentage of combined oxygen. The oxygen content is determined according to ordinary analytical procedures by analysis of the total product.

The percentage of combined oxygen in the products of this embodiment of the invention is broadly in the range from $$\frac{18D^2 + 12D + 2}{5D(\rho D^2 + 1.8D + 1.2)}$$

to 25%, where D is the average particle diameter in millimicrons and $\rho$ is the density of the bocasi in grams per milliliter. The densities of the bocasis are already well known and are in the range of about from 2 to 10. Thus, broadly, when $\rho=2$ and $D=1$ the lower limit of the percent oxygen is 1.28. When $\rho=10$ and $D=1$ the percent oxygen is 0.5. When $\rho=2$ and $D=200$ the percent oxygen is 0.09. When $\rho=10$ and $D=250$ the percent of oxygen is 0.015.

A preferred range of bocasi particle diameter is from 10 to 100 millimicrons. With particles in this range the preferred oxygen contents are within the range of $30/\rho D$ to 10%.

(f) Utility.—The bocasi powders of the invention are useful as binders in refractory bodies. They can be incorporated with relatively coarse powders of other refractory compositions to give products of greatly improved properties. Many refractory materials, also possessing very desirable high-temperature stability, are lacking in mechanical strength and resistance to shock, both thermal and mechanical. These deficiencies are related to poor binding between the particles of the refractory and to the difficulty of obtaining compositions approaching the theoretical density of the constituent material. The macro-molecular particles of the compositions of this invention enable greatly improved binding and higher densities to be obtained by conventional procedures such as dry pressing or slip casting, followed by sintering. The lower sintering temperatures which are required to form strong refractory articles constitute a further advantage of using the bocasi compositions of this invention as binders.

The particulate bocasi products of this invention can also be used as materials of construction through powder metallurgy techniques. Thus, they can be hot-pressed, compacted under pressure and sintered, or fabricated by flame techniques, to form articles of any desired shape. Such articles are characterized by having unusually high impact strength and resistance to thermal shock.

They are also very useful as catalyst, catalyst supports, extremely fine abrasive and polishing agents, fillers and reinforcing agents in organic and inorganic polymers and glasses, and as the hard phase in dispersion-hardened metals.

The processes and bocasi powder products of the present invention will be better understood by references to the following illustrative examples wherein parts and percentages are by weight unless otherwise specified.

EXAMPLE 1

The apparatus used in carrying out this reaction consists of a cylinder 4 inches in diameter and 11 inches high, fabricated from 1/16 inch sheet "Inconel" (80% Ni; 13% Cr; 7% Fe). The cylinder is contained in a 1/4 inch wall "Duralloy" (65% Fe; 20% Cr; 15% Ni) pot provided with a flange to which is bolted a tightly fitting head. Two tapered joints are attached to the head. Retort-shaped glass bulbs are inserted in the tapered joints and the solid powder reactants are dispensed from these bulbs by rotating them in the joints so that the powder spills over into the reactor. A stirrer, made from 1/2 inch "Inconel" tube with flat blades of Inconel welded to the tube, enters the reactor via an asbestos packed bearing. The temperature in the reactor is recorded by means of a thermocouple inserted inside the hollow stirrer shaft. An electrically heated furnace surrounds the pot, the temperature of the furnace being recorded by means of another thermocouple.

Five hundred parts of anhydrous calcium chloride are charged to the reactor and the air in the system is displaced by passing argon, previously gettered over finely divided titanium metal at 800° C., into the reactor, the gas exit being connected to a bubbler. The calcium chloride is melted and the melt brought to 875° C. with good agitation by the mechanical stirrer.

Aliquots of the mixed reactants, consisting of 16 parts colloidal titania powder, 8 parts of commercial calcium carbide (80% $CaC_2$), and 12 parts of calcium, are charged at five-minute intervals to the reactor by manipulating the addition bulb and controlling the rate of addition by observing the heat evolved, as recorded by the stirrer thermocouple. The temperature is maintained in the range of 875 to 925° C. during the reaction, the addition being completed over a period of eighty minutes and a total of 240 parts titanium dioxide, 120 parts commercial calcium carbide, and 180 parts of calcium being added. The melt is kept at 875 to 900° C. with stirring for a further period of one hour. Then after raising the stirrer from the melt, the salt is allowed to cool to room temperature under argon. The solidified salt cake is broken up and pulverized.

The crushed salt cake is stirred with ice water, glacial acetic acid is added to dissolve the calcium oxide by-product, and the pH is finally adjusted to 8.0. The insoluble residue is recovered by centrifugation, using a Sharples Super-Centrifuge, and the process of washing to remove soluble salts and calcium oxide, followed by centrifuging, is repeated three times, adding acetic acid to adjust the final pH of each wash to 7.0. The final washings are free from chloride and calcium and the residue, consisting of particulate titanium carbide, is dried in a vacuum oven at 100° C.

X-ray diffraction, using monochromatized CuKα radiation, gives a good pattern with "d" values corresponding to TiC and the line broadening coefficient $K'$ is calculated to be $9.4 \times 10^{-4}$. Nitrogen surface area measurement gives a surface area of 16 square meters per gram, corresponding to an average particle size of 75 millimicrons, as calculated by the surface area particle size relationship described earlier.

Emission spectrographic analysis shows the product to contain small amounts of calcium, nickel, iron, chromium and silicon as impurities.

The crystallite atomic extensity coefficient of the titanium carbide product as determined from nitrogen surface area measurement is 6.68.

EXAMPLE 2

The apparatus used in carrying out the reaction is similar to that described in Example 1.

One thousand parts of anhydrous calcium chloride are charged to the reactor, 120 parts of colloidal silica powder are charged to one of the bulbs, and a mixture of 120 parts of calcium pellets with 80 parts of commercial calcium carbide (80% $CaC_2$), crushed to pass through a 20 mesh sieve, is charged to the other bulb. The air in the system is displaced by passing argon, previously gettered over finely divided titanium metal at 800° C., into the reactor, the gas exit being connected to a bubbler. The calcium chloride is melted and the melt brought to 900° C. with good agitation by the mechanical stirrer.

By manipulating the addition bulbs, the reactants are charged to the reactor in small aliquots, alternating the additions and controlling the rate of addition by observing the heat evolved as recorded by a thermocouple in the melt. By this procedure it is possible to keep close to the stoichiometry of the reaction for reduction of the silica and conversion to silicon carbide. The temperature is maintained in the range 900–950° C. throughout the reaction, the addition being completed over a period of one and one-quarter hours, and an argon atmosphere being maintained throughout. The melt is kept at 940–950° C. with stirring for a further period of one and one-half hours, and the stirrer and thermocouple are then raised above the level of the melt, which is allowed to cool to room temperature under argon. The solidified salt cake is then broken up and pulverized.

The crushed salt cake is stirred with a 20% solution of acetic acid in methanol at 0° C. in an argon atmosphere, and centrifuged to recover the insoluble material. After two extractions with methanolic acetic acid and two using methanol, the supernatant is free from chloride.

The residue, consisting of particulate silicon carbide, is dried in a vacuum oven.

X-ray diffraction using monochromatized CuKα radiation shows the product to be mainly β-silicon carbide and $K'$ is calculated as $1.1 \times 10^{-2}$. Nitrogen surface area measurement gives a surface area of 180 square meters per gram corresponding to an average particle size of 10.5 millimicrons as calculated by the surface area particle size relationship given earlier.

Emission spectrographic analysis shows the product to contain less than 0.1% iron, chromium and nickel. Analysis for silicon, carbon, and oxygen is consistent with that of a mixture of 70% silicon carbide and 25% silica.

The crystallite atomic extensity coefficient of the product as determined from X-ray diffraction line broadening coefficient is 4.46.

EXAMPLE 3

The procedure of Example 2 is repeated, increasing the amounts of silica, calcium, and calcium carbide to 150, 150, and 100 parts by weight, respectively, and maintaining the temperature in the range 1000 to 1050° C. The product is recovered from the salt cake as described in Example 2.

X-ray diffraction gives a good pattern for β-silicon carbide and the average value of $K'$, for several lines of the CuKα diffraction pattern, is computed to be $5.2 \times 10^{-3}$. Emission spectrographic analysis shows the product to contain less than 1% iron, chromium and nickel. Analysis for silicon, carbon and oxygen corresponds to a mixture of 92% silicon carbide and 4.5% silica.

The crystallite atomic extensity coefficient of the product as determined from X-ray diffraction line broadening coefficient is 5.44.

EXAMPLE 4

Using the procedure of Example 2, 280 parts by weight of boric oxide are reacted, in a melt consisting of 1000 parts of calcium chloride, with 450 parts of calcium and 67 parts of calcium carbide (96% $CaC_2$) over a period of 2 hours at 780 to 830° C., followed by stirring for 30 minutes at 780 to 800° C.

The product is recovered from the salt cake by the procedure described in Example 2, using methanolic acetic acid, followed by methanol extraction to remove the soluble salts. The dry product is a black powder with a nitrogen surface area of 42 square meters per gram corresponding to a particle size of 75 millimicrons. The X-ray diffraction pattern shows $B_4C$ to be the main crystalline phase present with $K'$CuKα$=1.2 \times 10^{-3}$.

The crystallite atomic extensity coefficient of the boron carbide product as determined from X-ray diffraction line broadening coefficient is 7.50.

EXAMPLE 5

Using the procedure of Example 2, 123 parts by weight of colloidal zirconia powder are reacted with 120 parts of calcium and 80 parts of commercial calcium carbide (80% $CaC_2$), crushed to pass through a 20 mesh sieve, in a melt containing 1000 parts of calcium chloride at 1050–1100° C.

The salt cake is extracted with methanolic acetic acid and methanol to remove soluble salts, and a black powder recovered. A good X-ray diffraction pattern of zirconium carbide is obtained for this material with $K'$CuKα$=6 \times 10^{-4}$. The principal metallic impurities are iron, chromium and nickel, as indicated by electron spectrographic analysis. Electron micrographs show the average particle size to be below 200 millimicrons.

The crystallite atomic extensity coefficient of the product as determined from electron micrograph measurement is 8.44.

EXAMPLE 6

Using the procedure of Example 2, 150 parts by weight of colloidal vanadium trioxide are reacted with 92 parts of sodium and 70 parts of sodium carbide in a melt containing 750 parts of lithium chloride-potassium chloride eutectic mixture at 650–700° C. over a period of one and one-half hours, followed by stirring the melt at 650–700° C. for a further hour.

The salt cake is extracted and the product recovered, as described in Example 1.

The X-ray diffraction pattern of the product corresponds to submicron crystallites of VC with $$K'CuK\alpha = 3.2 \times 10^{-3}$$

The crystallite atomic extensity coefficient of the vanadium carbide product as determined from X-ray diffraction line broadening coefficient is 6.13.

EXAMPLE 7

The procedure of Example 6 is repeated, substituting 250 parts by weight of colloidal niobium dioxide for the 150 parts of vanadium trioxide and 46 parts of sodium for the 92 parts of sodium, and the product is isolated as before.

Chemical analysis and X-ray diffraction identify the product as NbC, with an oxygen content of 1.5% metallic impurities less than 1% and $K'CuK\alpha = 1.5 \times 10^{-3}$.

The crystallite atomic extensity coefficient of the niobium carbide product as determined from X-ray diffraction line broadening coefficient is 7.03.

EXAMPLE 8

A mixture of 1000 parts by weight of sodium chloride and 225 parts of molybdenum dichloride is charged to the reactor and the air is displaced by passing argon, previously gettered over finely divided titanium metal at 800° C. into the reactor. The salts are melted and the melt brought to 850° C. with good agitation by stirring. A mixture of 50 parts by weight of sodium carbide and 65 parts of sodium is slowly added to the melt, using the procedure of Example 1, over a period of one hour, the temperature being maintained in the range of 850–900° C. When addition of the reactants is complete, the melt is stirred for a further period of 30 minutes at 850 to 880° C.

The crushed salt cake is slurried under argon with ethylene glycol to remove by-product sodium chloride and centrifuged to recover the insoluble material. After four extractions, the ethylene glycol supernatant is free from chloride. The residue is washed with anhydrous ether and dried in a vacuum oven at 80–90° C.

X-ray diffraction shows the presence of both Mo$_2$C and MoC and $K'CuK\alpha = 9.3 \times 10^{-4}$. Oxygen content is 1.8% and metallic impurities by emission spectrograph are 0.51%, mainly chromium and nickel. Nitrogen surface area is measured as 8.5 square meters per gram which gives an average particle size of 85 millimicrons when calculated using the average density of a mixture consisting of 35% Mo$_2$C and 65% MoC.

The crystallite atomic extensity coefficient of the molybdenum carbide product as determined from nitrogen surface area measurement is 6.46.

EXAMPLE 9

Using the procedure of Example 2, 450 parts by weight of colloidal chromic oxide are reacted with 160 parts of commercial calcium carbide (80% CaC$_2$) and 160 parts of calcium in a melt containing 1500 parts of calcium chloride, at 950 to 1000° C. In this preparation, the "Inconel" pot of the apparatus of Example 2 is replaced by an impervious graphite pot 4 inches in diameter, 12 inches high, and a wall thickness of ¼ inch. The lower section of the stirrer, which is immersed in the melt, is fabricated from 1 inch diameter graphite tube with flat graphite blades.

The product is recovered by methanolic acetic acid extraction, as described in Example 2, until free from chloride, and finally dried in a vacuum oven to give the product particles a controlled oxygen content. X-ray diffraction does not give a clean pattern, although Cr$_3$C$_2$ is the main phase present. The product appears to be a mixture of several carbides. The values of $K'CuK\alpha$ calculated for several diffraction lines range from $4.9 \times 10^{-4}$ to $6.1 \times 10^{-4}$.

EXAMPLE 10

Using the procedure of Example 2, 450 parts by weight of colloidal tungstic oxide is reacted with 80 parts of calcium carbide (80% CaC$_2$) and 200 parts of calcium, the reactants being added to 1000 parts of molten calcium chloride at 1000 to 1040° C., over a period of three hours.

The product is recovered by methanolic acetic extraction until free from chloride and dried.

The resulting grey powder gives a good X-ray diffraction pattern for tungsten carbide, with $KCuK\alpha = 3.4 \times 10^{-3}$. Analysis gives 92% tungsten carbide and an oxygen content of 1.6%.

The crystallite atomic extensity coefficient of the product as determined from X-ray diffraction line broadening coefficient is 5.99.

EXAMPLE 11

A mixture of 1000 parts by weight of lithium chloride and 360 parts by weight of titanium dichloride is charged to the reactor of Example 1 and the air is displaced by passing into the reactor, argon previously gettered over finely divided titanium metal at 800° C. The salts are melted and the melt brought to 650° C. with good agitation by stirring. Sodium and sodium borohydride are continuously charged to the melt at the rates of 1 part and 1.6 parts, respectively, per minute for 70 minutes, the temperature being maintained in the range of 650 to 670° C. When addition of the reactants is complete, the melt is stirred for a further period of 30 minutes at 640 to 660° C. The exit gases, argon and hydrogen, carry over a fine black powder which is removed in ethylene glycol scrubbers.

After completing the reaction step, the stirrer and thermocouple are raised above the level of the melt, which is then allowed to cool to room temperature, an inert atmosphere being maintained by passing argon into the top of the reactor. The solidified salt cake thus formed is broken up and pulverized.

The crushed salt cake is slurried with ethylene glycol in an argon atmosphere, and centrifuged to recover the insoluble material. After four extractions, the ethylene glycol supernatant is free from chloride and the residue is washed with anhydrous ether.

The particulate titanium boride is dried in a vacuum oven, the partial pressure of oxygen present being sufficient only to give the desired amount of product oxidation indicated below.

X-ray diffraction shows the product to be mainly titanium boride, TiB$_2$, with $K'CuK\alpha = 2.1 \times 10^{-3}$. Nitrogen surface area measurement gives an average particle size of 30 millimicrons as calculated by the surface area particle size relationship given earlier.

Emission spectrographic analysis shows the product to contain less than 1.0% of metallic impurities and these are mainly iron, chromium and nickel, which are the constituents of "Inconel" alloy. The oxygen found in the product is 1.5%, corresponding to a titanium dioxide content of 3.8%.

EXAMPLE 12

One thousand parts of anhydrous calcium chloride are charged to the reactor of Example 2, 250 parts of colloidal titanium dioxide powder are charged to one of the addition bulbs, and a mixture of 200 parts of calcium pellets with 105 parts of calcium boride, crushed to pass through a 20 mesh sieve, is charged to the other addition bulb. The air in the system is displaced by passing argon, previously gettered over finely divided titanium metal at 800°, into the reactor, the gas exit being connected to a bubbler. The calcium chloride is melted and the melt brought to 900° C., with good agitation by the stirrer.

By manipulating the addition bulbs, the reactants are charged to the reactor in small aliquots, alternating the additions and controlling the rate of addition by observing the heat evolved as recorded by the thermocouple in the reactor. By this procedure it is possible to keep close to the stoichiometric proportions of reactants required for reduction of the titania and conversion to titanium boride. The temperature is maintained in the range 1050 to 1100° C., throughout the reaction, the addition being completed over a period of two hours, and an argon atmosphere being maintained throughout. The melt is kept at 1050 to 1100° C. with stirring for a further period of one and one-half hours, and the stirrer and thermocouple are then raised above the level of the melt, which is allowed to cool to room temperature under argon. The solidified salt cake thus obtained is broken up and pulverized.

The crushed salt cake is stirred with a 20% solution of acetic acid in methanol at 0° C. in an argon atmosphere and centrifuged to recover the insoluble material. After two extractions with methanolic acetic acid and two using methanol, the supernatant is free from chloride and the residue is dried in a vacuum oven, the partial pressure of oxygen in the oven atmosphere being sufficient only to give the desired content of oxygen in the product.

X-ray diffraction shows the product to be mainly titanium boride, $TiB_2$, and $KCuK\alpha$ is calculated for several lines to be $1.6 \times 10^{-3} \pm 0.2 \times 10^{-3}$. Nitrogen surface area measurement gives an average calculated particle size of about 80 millimicrons.

Emission spectrographic analysis shows the product to contain less than 0.3% iron, chromium and nickel. Analysis for titanium boride and oxygen is consistent with a mixture of 91% titanium boride and 8% titania.

The crystallite atomic extensity coefficient of the product as determined from nitrogen surface area measurement is 4.82.

EXAMPLE 13

The procedure of Example 12 is repeated, using 1000 parts of anhydrous calcium chloride in the reactor, 250 parts of colloidal zirconium dioxide powder in one addition bulb, and a mixture of 400 parts of calcium pellets with 200 parts of calcium tetraborate, crushed to pass through a 20 mesh sieve, in the other addition bulb. The reactants are added to the melt at 870–910° C. over a period of 3 hours and the product recovered from the salt cake as described in Example 12.

The X-ray diffraction pattern corresponds to zirconium boride, $ZrB_2$, with $KCuK\alpha = 8.5 \times 10^{-4}$. Analysis for zirconium, boron and oxygen corresponds to a mixture of 94% zirconium boride and 3% zirconia. Emission spectrographic analysis shows the product to contain less than 1% iron, chromium, nickel, and calcium.

The crystallite atomic extensity coefficient of the product as determined from electron micrograph measurement is 6.07.

EXAMPLE 14

The reaction system is that described in Example 2, with the change that only one of the charging bulbs is used. The procedure is that described in Example 11. Eighty parts by weight of sodium borohydride and 50 parts of sodium are added over a period of 1 hour to a melt consisting of 700 parts of lithium chloride and 330 parts of niobium dichloride. The temperature is in the range of 600 to 630° C. throughout the addition, and the bath is held at this temperature for a further period of 1 hour with stirring, following the addition of the sodium borohydride. The product is recovered from the salt cake as described in Example 11.

The X-ray diffraction pattern corresponds to niobium boride, NbB, with $KCuK\alpha = 7.2 \times 10^{-3}$. Analysis for niobium, boron and oxygen corresponds to a mixture of 94% niobium boride and 3.5% niobium oxide. Emission spectrographic analysis shows the product to contain less than 0.5% iron, chromium, nickel and calcium.

The crystallite atomic extensity coefficient of the product as determined from X-ray diffraction line broadening coefficient is 5.07.

EXAMPLE 15

Using the apparatus and procedure of Example 9, 305 parts by weight of colloidal chromic oxide are reacted with 140 parts of boric oxide and 480 parts of calcium in a melt consisting of 1500 parts of calcium chloride at 1000 to 1050° C.

The product is recovered by methanolic acetic extraction and finally dried in a vacuum oven. It analyzes as 93% chromium boride, with the composition $CrB_{1.42}$. X-ray diffraction does not give a clean pattern, and the product appears to be a mixture of several of the chromium borides. The range of values calculated for $K'CuK\alpha$ for several lines is $4.2 \times 10^{-4}$ to $6.4 \times 10^{-4}$.

EXAMPLE 16

This example illustrates the preparation of an oxide-containing, particulate titanium silicide according to a process of the invention. The reactor used is that described in Example 1.

A mixture consisting of 700 parts by weight of calcium chloride and 480 parts by weight of titanium dichloride is charged to the reactor and the air is displaced by passing argon, previously gettered over finely divided titanium metal at 800° C. through the reactor. The salts are melted and the melt brought to 830° C. with good agitation by the stirrer. A mixture of 240 parts by weight of colloidal silica and 580 parts of calcium is added slowly to the melt over a period of two and a half hours. The temperature of the melt increases to 890° C. and is maintained between 850 and 890° C. throughout the reaction.

After stirring the melt for a further 30 minutes at 850 to 870° C. the stirrer and thermocouple are raised about the level of the melt, and the melt is allowed to cool to room temperature, an inert atmosphere being maintained by passing argon into the top of the reactor. The solidified salt cake thus obtained is broken up and pulverized.

The crushed salt cake is slurried with methanolic acetic acid in an argon atmosphere, to prevent oxidation, and centrifuged to recover the insoluble material. After four extractions, the methanol supernatant is free from chloride and the residue is washed with anhydrous ether and dried in a vacuum oven, the oxygen content of the oven atmosphere being sufficient only to give the desired oxide content in the product as described below.

X-ray diffraction shows the product to be titanium silicide, TiSi, and the average value of $K'CuK\alpha$ for several lines is calculated as $1.9 \times 10^{-3}$. Chemical analysis for titanium and silicon corresponds to 94% of a composition $TiSi_{1.1}$, indicating minor amounts of higher silicides to be present. Nitrogen surface area measurement gives an average particle size of about 35 millimicrons.

Emission spectrographic analysis shows the product to contain less than 1.0% of metallic impurities, and these are mainly iron, chromium and nickel, which are the constituents of "Inconel" alloy. The oxygen found in the product is 1.25%, corresponding to a titanium dioxide content of 3.1%.

EXAMPLE 17

Using the procedure of Example 2, 140 parts by weight of colloidal silica powder are reacted with 235 parts of calcium molybdate and 330 parts of calcium in a melt consisting of 1000 parts of calcium chloride at 880 to 900° C. over a period of 2 and ½ hours. The melt is stirred for a further ½ hour at 880 to 900° C. The product is recovered by aqueous extraction, as described in Example 16.

One hundred parts by weight of the dry powder are refluxed for 1 hour with 2000 parts of 1 normal sodium hydroxide, filtered, and washed free from alkali. The residue is dried in a vacuum oven at 80 to 90° C.

The product analyzes at 91% MoSi$_2$ with an oxygen content of 3.5%. Emission spectrographic analysis shows less than 1% calcium and less than 2% iron, chormium and nickel to be present in the product. X-ray diffraction gives a good pattern for MoSi$_2$, and $K'$CuK$\alpha$=8.6×10$^{-4}$. The nitrogen surface area is 10 square meters per gram, which corresponds to an average particle size of 80 millimicrons.

The final aqueous wash contains 0.5% product in the form of a stable dispersion, and this is concentrated to 11% solids by vacum evaporation. The particle size is 80 to 130 millimicrons by electron micrograph, and the percent solids in the dispersed phase is found to be 70%. A sample of the dried down solid gives a good X-ray pattern for molybdenum disilicide.

Fifty grams of the vacuum dried solids obtained after alkali treatment and drying, are dispersed in 300 cc. of water and this is milled in a rubber lined mill using tungsten carbide balls as previously described in Example 11. The resulting slurry after separation of the tungsten carbide balls is deionized, also as described in Example 11, and the pH adjusted to 9.5 using ammonium hydroxide. This gives a well dispersed sol of substantially discrete molybdenum disilicide particles, 80 to 100 millimicrons in size. The specific resistivity of this sol is found to be greater than 18,000 ohms.

The crystallite atomic extensity coefficient of the product as determined from nitrogen surface area measurement is 6.78.

EXAMPLE 18

One hundred twenty-five parts by weight of sodium molybdate (dihydrate), 220 parts of sodium silicate (pentahydrate) and 1000 parts of sodium chloride are charged to a "Monel" reactor, the mixture is heated slowly to dehydrate it, and finally the well-stirred melt is brought to 915° C. under an argon atmosphere. Two hundred ten parts of metallic calcium is added in small aliquots over a period of five and one-half hours while maintaining the temperature at 915 to 925° C., the sodium by-product being distilled from the reactor. The product is recovered by aqueous extraction, as described in Example 16.

The product analyzes 91% MoSi$_2$, with an oxygen content of 3.2%. Emission spectrographic analysis shows less than 1% calcium and less than 2% iron, chromium, and nickel to be present in the product. X-ray diffraction gives a strong, sharp MoSi$_2$ pattern and the nitrogen surface area is 22 square meters per gram.

Forty parts by weight of the above product are refluxed for one hour with 1000 parts of normal sodium hydroxide, the mixture is filtered, and the residue worked free from alkali. The residue is dried in a vacuum oven at 80 to 90° C. and anlyzes as 94% MoSi$_2$ with an oxygen content of 1.5%. The nitrogen surface area is 5 square meters per gram, corresponding to an average particle size of 200 milimicrons. A good, clear MoSi$_2$ X-ray pattern is obtained, and from the measured line broadened $K'$CuK$\alpha$ is calculated to be 4.1×10$^{-4}$.

The crystallite atomic extensity coefficient of the product as determined from nitrogen surface area measurement is 7.69.

EXAMPLE 19

To prepare a bocasi consisting of a solid solution of titanium diboride and zirconium diboride, a raw material mixture is prepared consisting of 80 parts of 0.4 micron titanium dioxide, 123 parts of 50 millimicron zirconia, 195 parts of calcium tetraborate and 410 parts of metallic calcium by blending the powders.

The reaction is conducted in a melt of 1000 parts of calcium chloride in an "Inconel" liner equipped with an "Inconel" stirrer while the temperature is maintained at 950–1000° C. Inconel is an alloy composed of 73% nickel, 18% chromium and about 8–9% iron. The raw material powder is divided into ten equal portions and one portion is added as increments to the stirred molten salt every ten minutes. The reaction mixture is held for one hour at 1000° C. after the last increment has been added. The reaction mixture is drained from the reactor under a nitrogen atmosphere, cooled and solidified.

The insoluble product is recovered as follows: The soluble salts are dissolved in water acidified with HCl to a pH of 2. The insoluble product is washed with water, adjusted to pH 2 with HCl, followed by four washings with distilled water and recovered from suspension by centrifugation. The wet powder is dried in a vacuum oven, swept with nitrogen, at a vacuum of 29 inches of mercury.

X-ray identification and chemical analysis concur in indicating that it is a 50:50 mole percent solid solution of titanium diboride and zirconium diboride.

Electron micrograph and nitrogen surface area measurements show the ultimate crystal size to be about 40 millimicrons.

Chemical analysis shows this product to be about 94% titanium diboride-zirconium diboride, and about 4% of titanium-zirconium oxide. The line broadening coefficient $K'$ by X-ray for copper K, $\alpha$ radiation is equal to 2.2×10$^{-3}$.

EXAMPLE 20

Conducting the reaction and recovering the product as in Example 19, a bocasi powder containing 20 mole percent tungsten carbide, 40 mole percent niobium carbide, and 40 mole percent titanium carbide, is prepared by adding increments of 4.7 parts of niobium oxide

(Nb$_2$O$_3$)

3.2 parts of titanium oxide, 5.8 parts of calcium tungstate, 1.2 parts of carbon, and 8.4 parts of calcium metal. Ten such increments are added with 10 minutes of holding time between each addition.

Recovery is substantially the same as in Example 19. Chemical analysis and X-ray identification show the product to be a ternary solid solution of tungsten carbide, titanium carbide and niobium carbide, with a lattice constant consistent with the mole percentages of the various constituents used in the starting oxides.

Nitrogen surface area measurements indicate an average particle size of about 30 millimicrons, and the $K'$ for copper K$\alpha$ radiation is 1.5×10$^{-3}$. Chemical analysis indicates that the product comprises about 95% of niobium-, titanium-, tungsten-carbides in the mole ratio of the starting materials, and contains about 1.4% oxygen.

EXAMPLE 21

This example demonstrates the preparation of silicon carbide by use of magnesium as a reducing agent, and the subsequent preparation of a sol from the aggregated powders obtained by the primary reaction.

Twenty-five hundred parts of calcium chloride are loaded into a carbon crucible equipped with a carbon stirrer. This is heated under argon to a temperature of 1000° C., and 15 increments are added, each increment containing 15 parts of colloidal silica in the form of a dry powder, 13 parts of magnesium turnings, and 1.4 parts of a finely divided 300 square meters per gram surface-area carbon black. The 15 increments are added at four-minute intervals, and the melt is quenched immediately after the last addition.

Twenty-five hundred fifty parts of salt cake are recovered, crushed, and put very cautiously into 8 liters of an ice cold, 3 N hydrochloric acid solution. After the salt, calcium oxide, and magnesium oxide by-products are dissolved, the product is washed two times with water and dried in a vacuum oven.

One hundred eleven parts are recovered, having the following analysis: 67.6% silicon, 22% carbon and 6.5% oxygen. Emission spectrographic analysis shows impurities at the following levels: .2 to 1% calcium, .1 to 1% molybdenum, and .05 to .25% of iron, magnesium, chromium, and nickel, respectively.

In view of the relatively high oxygen content, indicating some unreacted silica, the product is refluxed for one hour with 2 liters of 2 N sodium hydroxide, following which it is washed until the pH of the effluent water is 6; a 66% recovery is obtained.

The material recovered has the following analysis: 67.3% silicon, 27.7% carbon, 1.4% oxygen. Emission spectrograph shows .2% to 1% of impurities of magnesium, calcium, iron, and molybdenum, and .05% to .25% of aluminum, chromium, titanium, nickel, and zirconium.

The nitrogen surface area of this product is 13 square meters per gram, which corresponds to about 145 millimicrons as the size of the ultimate particles if they are discrete. The line broadening coefficient, $K'CuK\alpha$ radiation is $2.6 \times 10^{-3}$. Electron micrographs show the product to consist of 2 to 10 micron aggregates of much smaller ultimate units having a particle size in the range of 20 to 50 millimicrons.

The crystallite atomic extensity coefficient of the product as determined from nitrogen surface area measurement is 7.68.

This product is ball milled in a 5 inch outer diameter steel mill of about 2 quart capacity, using 2800 grams of steel balls, ¼ inch in diameter, along with 100 grams of the dried silicon carbide product described above, and 255 grams of propanol as a suspending solvent. Milling is continued for 56 hours on rubber-lined rolls with the mill turning at a rate of 80 revolutions per minute. The product is recovered by washing the steel balls on a large mesh screen and is heated in concentrated HCl at 90° C. to remove the iron picked up in the ballmilling operation. The product is washed once with 3 N HCl, and then several times with distilled water until the pH reaches 3.5. At this point the product is neutralized with amomnium hydroxide to a pH of 6 and centrifuged through a high speed centrifuge. The weight of the wet cake recovered from the centrifuging operation is 140 grams.

One hundred grams of this material is suspended in 500 milliliters of water and the pH adjusted to 8.5 with ammonium hydroxide. This is stirred for 10 minutes in a Waring Blendor and a sol of substantially discrete particles having ultimate units in the size range of 30 millimicrons at a solids concentration of about 9.22% is obtained. The relative viscosity of this sol in comparison with distilled water as a standard, is 2.43 at a pH of 8.2, and 2.08 at a pH of 10.5. Electron micrographs show the particles to be minute, short fibrils with a length to diameter ratio of about 5 to 1.

The crystallite atomic extensity coefficient of the product as determined from electron micrograph measurement is 6.16.

We claim:

1. A process for preparing particulate tungsten carbide comprising the steps of (a) dispersing in a molten metal halide solvent bath selected from among alkali metal chlorides and alkaline earth metal chlorides heated at a temperature of 400 to 1100° C. a reducing agent selected from among sodium, calcium and magnesium, together with a pair of solid reactants of which one is an inorganic compound which contains tungsten and the other contains carbon, in either elemental form or in an inorganic compound, the proportions of the reactants being such that the atomic ratio of tungsten and carbon in the reactants is the same as that in tungsten carbide, one of the reactants being an inorganic compound wherein tungsten has a positive valence, and the proportion of reducing agent being about that stoichiometrically required to reduce the tungsten and carbon to the valence state required to form tungsten carbide, the concentration of tungsten and carbon in the molten metal halide solvent bath being maintained at at least 100-fold the concentration required by the solubility product of tungsten carbide, whereby chemical reaction occurs to form tungsten carbide;

(b) continuing to heat the reaction mass until the tungsten carbide particles have flocculated; and (c) separating the flocculated tungsten carbide from the salt bath.

2. The process of claim 1 wherein the temperature of the molten metal halide bath is 600 to 1000° C.

References Cited

UNITED STATES PATENTS

| | | | |
|---|---|---|---|
| 2,729,689 | 1/1956 | Blanchard et al. | 23—208 XR |
| 1,098,794 | 6/1914 | Fleming | 117—118 X |
| 2,834,651 | 5/1958 | Gray | 23—208 (A) |
| 2,619,406 | 11/1952 | Briney | 23—204 |
| 2,906,605 | 9/1959 | Dubeck | 23—204 |
| 3,974,013 | 3/1961 | Litz | 23—191 |
| 3,138,468 | 6/1964 | Matkovich et al. | 23—204 X |
| 3,520,656 | 7/1970 | Meadows et al. | 23—208 X |

FOREIGN PATENTS

| | | | |
|---|---|---|---|
| 1,293,195 | 4/1962 | France | 23—208 A |
| 740,547 | 11/1955 | Great Britain | 23—208 A |
| 951,461 | 3/1964 | Great Britain | 23—208 A |
| 729,162 | 5/1955 | Great Britain | 23—208 (A) |

OTHER REFERENCES

A.P.C., abandoned application of Beck et al., Ser. No. 292,742 published July 13, 1943.

Schneider et al.: "Zeitschift für Anorganische und Allgemeine Chemie," vol. 279, pp. 94–103 (1955).

MILTON WEISSMAN, Primary Examiner

U.S. Cl. X.R.

423—345